United States Patent [19]

Miller

[11] Patent Number: 5,478,032
[45] Date of Patent: Dec. 26, 1995

[54] RETROFIT DRYWALL MOUNTING FRAME

[75] Inventor: Vernon R. Miller, Atlanta, Ga.

[73] Assignee: The Whitaker Corporation, Wilmington, Del.

[21] Appl. No.: 259,846

[22] Filed: Jun. 15, 1994

[51] Int. Cl.$^6$ ..................................................... G12B 9/00
[52] U.S. Cl. ........................... 248/27.1; 174/48; 220/3.5; 220/3.6; 248/56
[58] Field of Search ................................... 248/27.1, 27.3, 248/56, 906; 174/48; 220/3.3, 3.6, 3.5

[56] References Cited

U.S. PATENT DOCUMENTS

| | | | |
|---|---|---|---|
| 3,829,599 | 8/1974 | Fujioka | 174/48 |
| 4,006,872 | 2/1977 | Tanner | 248/27.1 |
| 4,063,660 | 12/1977 | Ware | 220/3.6 |
| 4,098,423 | 7/1978 | Marrero | 220/3.6 |
| 4,120,416 | 10/1978 | Suk | 220/3.4 |
| 4,124,267 | 11/1978 | Mines et al. | 339/125 R |
| 4,183,486 | 1/1980 | Esoldi | 248/205 R |
| 4,209,660 | 6/1980 | Flachbarth et al. | 174/48 |
| 4,226,393 | 10/1980 | Rardin et al. | 248/205 R |
| 4,227,594 | 10/1990 | Kluger | 188/361 |
| 4,297,524 | 10/1981 | Fork | 174/48 |
| 4,297,525 | 10/1981 | Bowden, Jr. | 174/48 |
| 4,500,746 | 2/1985 | Meehan | 174/48 |
| 4,576,431 | 3/1986 | Thayer | 339/131 |
| 4,638,963 | 1/1987 | Hernandez | 248/56 |
| 4,673,097 | 6/1987 | Schuldt | 220/3.5 |
| 4,688,596 | 8/1987 | Liebmann et al. | 137/360 |
| 4,754,533 | 7/1988 | Awakowicz et al. | 24/458 |
| 4,790,501 | 12/1988 | Waters | 248/27.1 |
| 4,794,207 | 12/1988 | Norberg et al. | 174/48 |
| 4,845,913 | 7/1989 | Bell | 52/699 |
| 4,892,212 | 1/1990 | Andreyko | 220/3.3 |
| 4,913,383 | 4/1990 | Hill et al. | 248/27.1 |
| 4,931,597 | 6/1990 | Kimbrough et al. | 174/48 |
| 4,955,825 | 9/1990 | Gorth et al. | 439/535 |
| 4,958,047 | 9/1990 | Bartee | 174/48 |
| 4,998,635 | 3/1991 | Vink et al. | 220/3.4 |
| 5,064,386 | 11/1991 | Dale et al. | 439/535 |
| 5,086,194 | 2/1992 | Bruinsma | 174/48 |
| 5,108,053 | 4/1992 | Biederstedt | 248/27.1 |
| 5,178,350 | 1/1993 | Vink et al. | 248/27.1 |
| 5,188,318 | 2/1993 | Newcomer et al. | 248/68.1 |
| 5,224,673 | 7/1993 | Webb | 248/27.1 |
| 5,238,426 | 8/1993 | Arnett | 439/557 |
| 5,239,132 | 8/1993 | Bartow | 174/58 |

*Primary Examiner*—Ramon O. Ramirez

[57] ABSTRACT

An apparatus (10) and method for mounting a wiring device (11) on a wall so that mounting on a stud is not necessary. A bracket (16) having a side member (17) is disposed in an opening in the wall such that a side member (17) of the bracket (16) is abutting the rear face of the wall. A mounting clip (25) is disposed in the opening in the wall with an ear (27) on the mounting clip (25) engaging the side member (17) and a flange (28) on the mounting clip (25) abutting the front face of the wall. A fastener passes through the flange (28) on the mounting clip (25), through the wall and into a mounting boss (21) on the side member (17) abutting the rear face of the wall, thereby securing the bracket (16) to the wall.

11 Claims, 5 Drawing Sheets

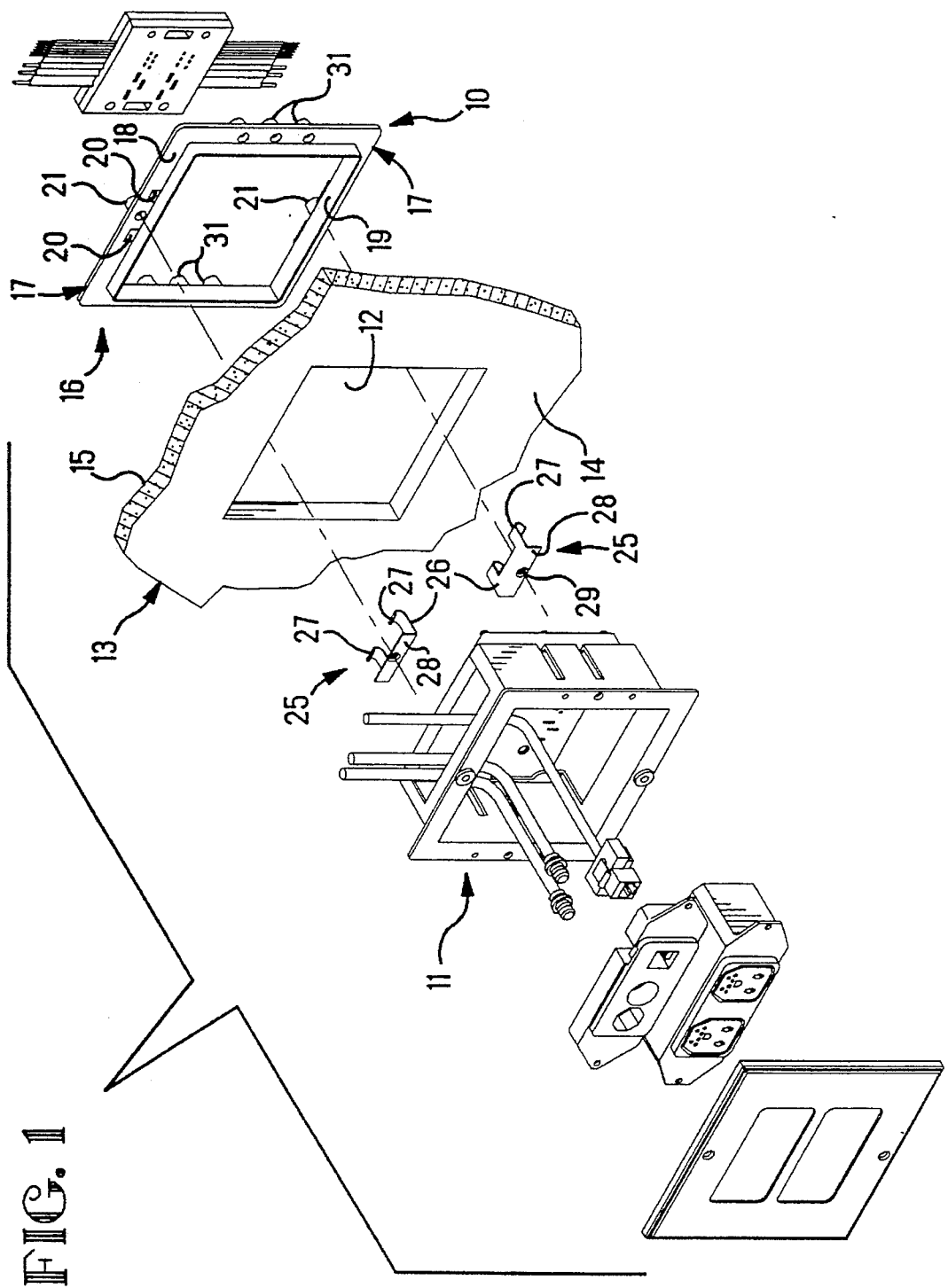

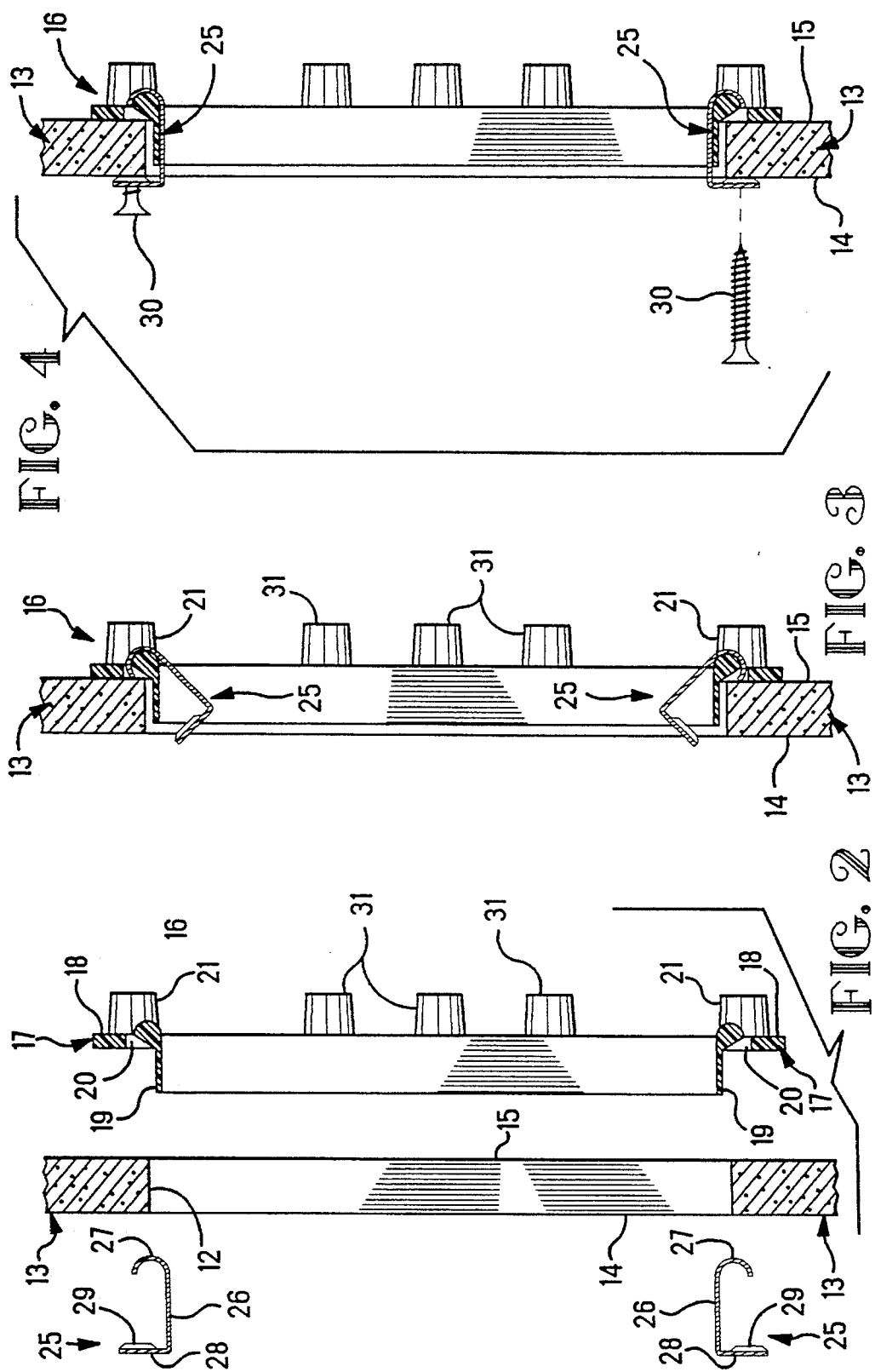

RETROFIT DRYWALL MOUNTING FRAME

FIELD OF THE INVENTION

The present invention relates to an apparatus and method for mounting a wiring device and more particularly, to a bracket mounted on a drywall to which the wiring device is attached, especially during retrofit procedures.

BACKGROUND ART

In houses and similar structures, it is common practice to install the wiring in the frame of the structure prior to placement of the drywall on the framing. In this construction, the wiring is connected to terminals and outlets in a wall or outlet box which is nailed to a stud.

In an intelligent wiring system disclosed in U.S. Pat. No. 5,064,386, a convenience outlet assembly having a wall box includes a mounting bracket assembly attachable to a stud and a wall box which can be attached to the mounting bracket. The assembly can be used with both power and signal conductors.

U.S. Pat. No. 4,576,431 discloses a fixture for securing an electrical connector such as an outlet plate to a wall. A flange on the fixture is disposed on the front face of the wall about an opening in the wall. Legs connected to the flange are bent within opening in the wall so that the legs are against the rear face of the wall.

A wall bracket for mounting an electrical connector to an aperture in a wall panel is disclosed in U.S. Pat. No. 4,892,212. A sheet metal front face mounting flange has tabs which are bent rearwardly through the aperture to the rear face of the wall. Screws are disposed through the flange to connect with the bent tabs.

U.S. Pat. No. 4,955,825 discloses an electrical fixture for mounting over a wall opening which eliminates the necessity for an outlet box. The fixture has a rectangular plate with an opening therein. Flanges perpendicular to the rectangular plate positions the plate with respect to the wall opening. Deformable fingers extend from the top and bottom of the plate so that the fingers can be bent inwardly against the back face of the wall.

U.S. Pat. No. 4,688,596 discloses a wall outlet box which has a frame portion mounted on the outer face of the wall. The frame has inwardly recessed portions which extend into the wall opening. A slot is provided on each vertical sidewall of the frame and a Z-shaped clip is provided to fit in each slot. Screws are used to mount the box to the wall.

Thus, although devices for mounting outlets in a wall are known, the devices are supported by a frame mounted on the outer face of the wall or by a bracket connected to a stud within the wall.

SUMMARY OF THE INVENTION

The present invention provides a retrofit drywall mounting frame which mounts on the rear face of the drywall and is not mounted on a stud within the wall.

In accordance with the teachings of the present invention, there is disclosed a mounting bracket for a wiring device. The mounting bracket is mounted on a wall having substantially planar front and rear faces and further having an opening therebetween, such that mounting to a stud is not necessary. The mounting bracket includes a bracket having at least one side member. The side member has at least a first portion abutting against the rear face of the wall. The first portion of the side member has a mounting boss formed thereon. A clip has a body portion abutting against the opening in the wall. An ear is carried by the body portion of the clip and engages the first portion of the side member of the bracket. A flange carried by the body portion of the clip abuts against the front face of the wall, thereby sandwiching the wall between the flange on the clip and the first portion of the side member of the bracket. The flange on the clip has an opening formed therein. A fastener passes through the opening in the flange, through the wall, and into the mounting boss on the first portion of the side member of the bracket, thereby securing the bracket to the wall.

These and other objects of the present invention will become apparent from a reading of the following specification, taken in conjunction with the enclosed drawings.

BRIEF DESCRIPTION OF THE DRAWINGS

FIG. 1 is an exploded perspective view showing the present invention and an opening in the wall board with a wiring device mounted thereon.

FIG. 2 is a cross-sectional exploded view of the bracket, the wall board with an opening therein and a pair of clips.

FIG. 3 is a cross-sectional view showing the bracket abutting the rear face of the wall board and the ear on each clip engaging the bracket.

FIG. 4 is a cross-sectional view showing the bracket abutting the rear face of the wall board and the fastening means passing through the clip and into the mounting boss on the bracket.

DESCRIPTION OF THE PREFERRED EMBODIMENTS

Figure 5:
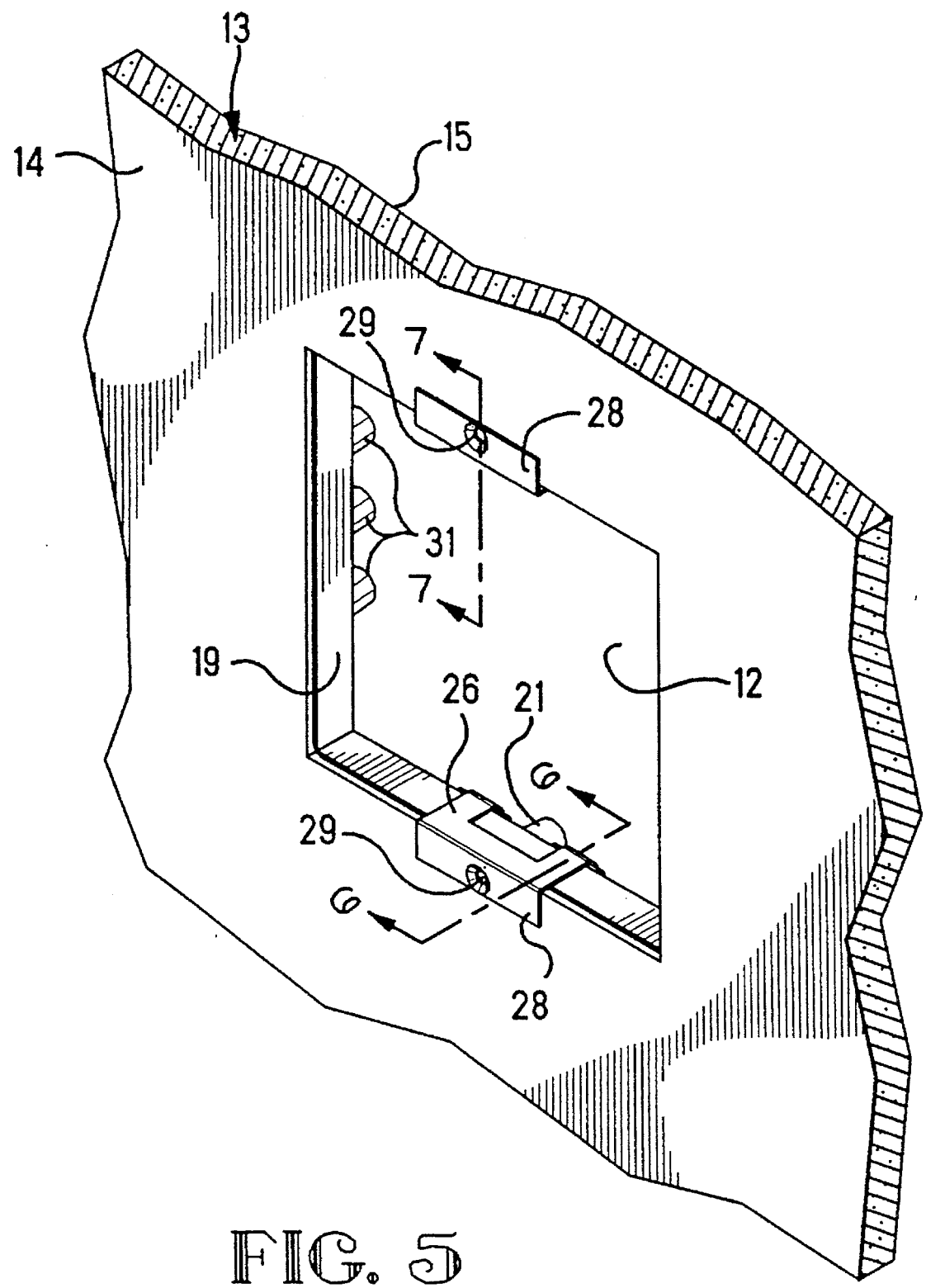
FIG. 5 is a perspective view showing the present invention mounted in an opening in the wall board with the fastener not shown.

With reference to the figures, there is shown a mounting bracket 10 for a wiring device 11. The mounting bracket 10 is mounted in an opening 12 a wall 13 such as a drywall or panelled wall. The wall 13 is substantially planar and has a front face 14 and a rear face 15. The mounting bracket 10 has a bracket 16 which is formed from plastic which may be molded, or formed from metal. The bracket 16 has at least one side member 17 which has at least a first portion 18 which abuts the rear face 15 of the wall 13. The bracket 16 preferably is a square or rectangle which has two pairs of substantially parallel side members 17, each of which has a first portion 18 abutting the rear face 15 of the wall 13. Preferably, the bracket 16 further has at least one second portion 19 which is substantially perpendicular to the respective first portion 18 and abuts the opening in the wall 12 between the front face 14 and the rear face 15 of the wall 13.

Each first portion 18 of respective side member 17 has a pair of spaced-apart recesses 20 formed therein. Between each pair of recesses 20 on each first portion 18, there is formed a mounting boss 21.

Figure 6:
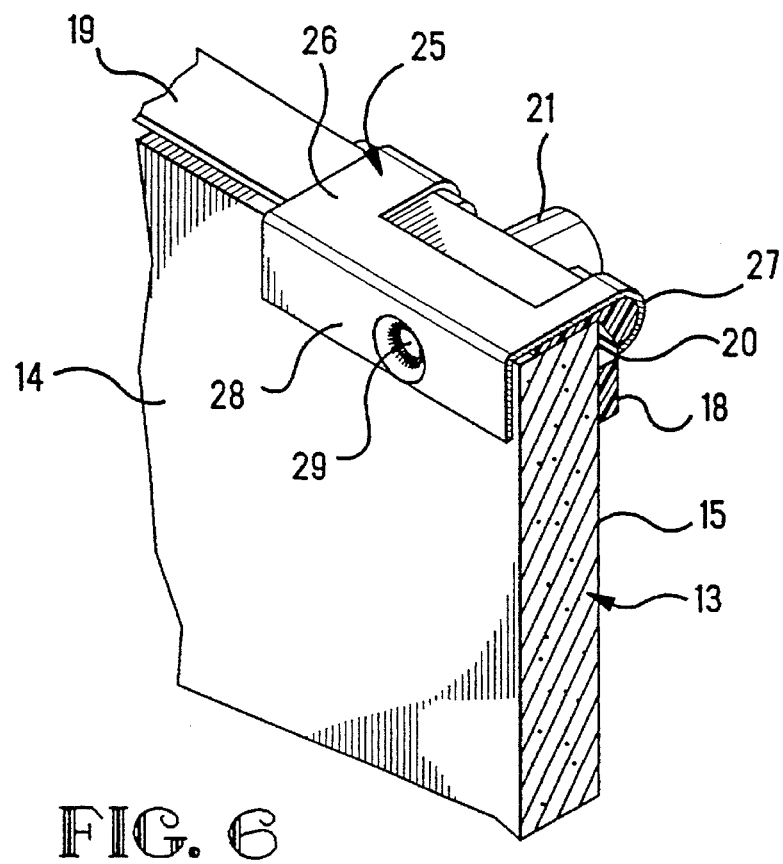
FIG. 6 is a cross-sectional view taken across the lines 6—6 of FIG. 5.
Figure 7:
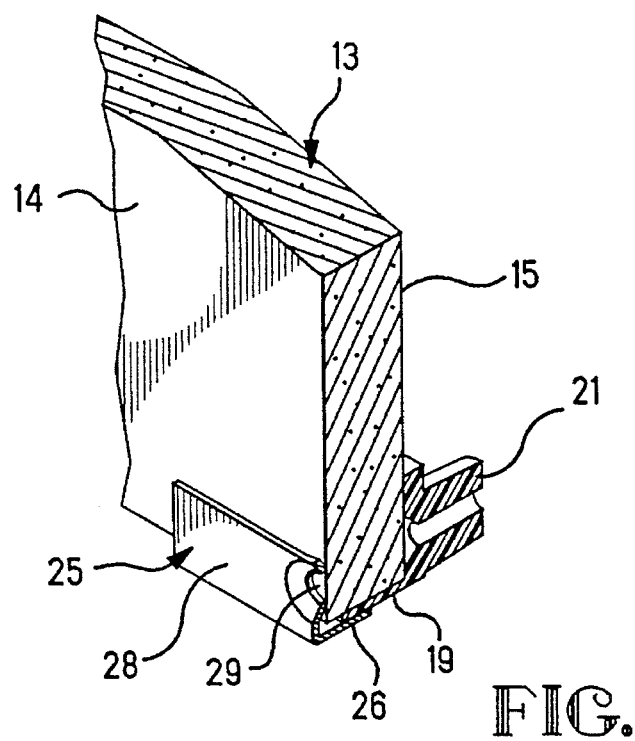
FIG. 7 is a cross-sectional view taken across the lines 7—7 of FIG. 6.
Figure 8:
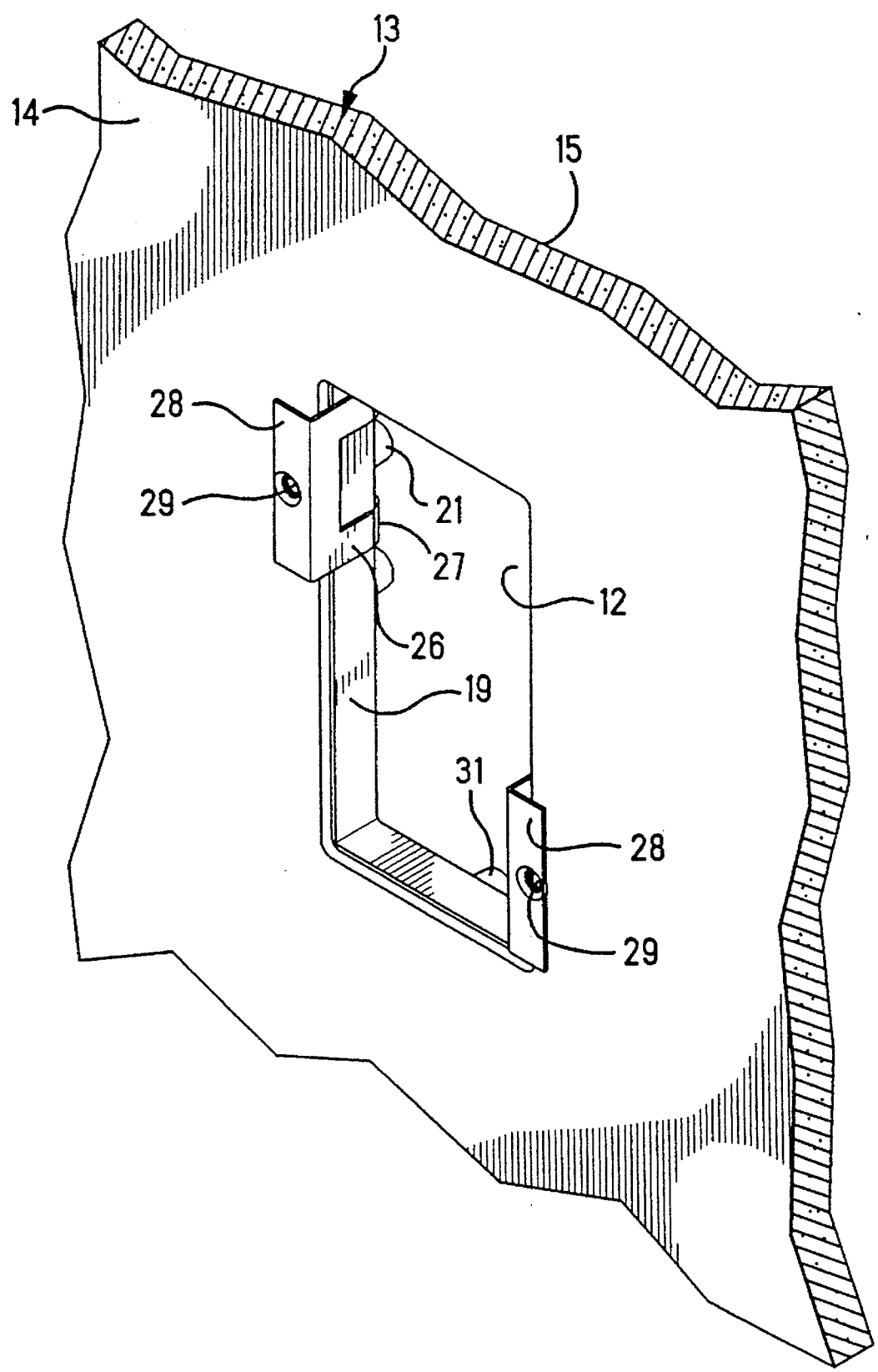
FIG. 8 is a perspective view of another embodiment of the present invention to accommodate a single type receptacle and with the clips offset with respect to one another.

A mounting clip 25 has a body portion 26, at least one ear 27 connected to the body portion 26 at one side thereof, and a flange 28 connected to the opposite side of the body portion 26. The mounting clip 25, preferably is formed from a stamped sheet metal. As shown in FIGS. 2–4, the mounting clip 25 is disposed in the opening in the wall 12 wherein the at least one ear 27 engages the respective recess 20 in the first portion 17 of the side member 17 of the bracket 16. Preferably, two ears 27 are provided on each mounting clip 25 and are engaged in the two spaced-apart recesses 20 in the first portion 17. Substantially arcuate-shaped ears 27, which are bent back towards the flange 28, facilitate engagement of the recesses 20. When so disposed, the body portion 26 of each mounting clip 25 abuts against the opening in the wall 12. For those brackets 16 having a second portion 19 of the side member 17, the body portion 26 of each mounting clip 25 abuts against the respective second portion 19. The flange 28 on each mounting clip 25 abuts against the front face of the wall 14 such that the wall 13 is sandwiched between the flange 28 on the mounting clip 25 and the first portion 18 of the side member 17 of the bracket 16 (FIGS. 6 and 7). The flange 28 further has an opening formed therein. A fastener 30, such as a threaded screw, passes through the opening in the flange 29, through the wall 13 and into the mounting boss 21 on the first portion 18 of the side member 17 of the bracket 16. In this manner, the bracket 16 is secured to the wall 13. Preferably, two mounting clips 25 are connected to opposite side members 17 of the bracket 16. The mounting clips 25 may be diametrically opposed to one another (FIG. 5) or may be offset (FIG. 8).

The bracket 16 further has a plurality of spaced-apart auxiliary bosses 31 formed on the side member 17 which is substantially perpendicular to the side member 17 to which the mounting clip 25 is engaged. A wiring device is connected to the bracket 16 by means of a threaded screw (not shown) or similar fastener from the standard fixture, through the wall 13 and into the auxiliary boss 31. The wiring device 11 may be an electrical toggle switch, an electrical convenience outlet, a data conductor, etc. carrying a signal over a wire as defined by the National Electric Code. The spacing between the auxiliary bosses 31 on the side member 16 coincides with the spacing of the fasteners in the wiring device 11 so that the wiring device 11 may be securely connected to the mounting bracket 16.

The method of mounting the bracket 16 for a wiring device 11 into an opening in a wall 12, is to insert the bracket 16 through the diagonal dimension of the opening 12 and to turn the bracket 16 within the opening 12. In this manner, the bracket 16 is positioned with the first portion 18 of the side member 17 disposed abutting, and flush with, the rear face 15 of the wall 13 and the second portion 19 of the side member 17 abutting the opening in the wall 12. The ears 25 on each mounting clip 25 are engaged with the respective recesses 20 in the first portion 18 of the side member 17 and each mounting clip 25 is pivoted such that each body portion 26 is substantially flush against the respective second portion 19 of the side member 16 within the opening in the wall 12. Each flange 28 on the respective mounting clip 25 is substantially flush with the front face 14 of the wall 13. A fastener 30 is inserted through the opening in the flange 29 of each mounting clip 25. Each fastener 30 passes through the mounting clip 25, through the wall 13 and into the mounting boss 21. In this manner, the mounting bracket 16 is secured to the wall 13 at any desired location without being attached to a stud in the wall 13. The use of two mounting clips 25, each with two ears 27, secures the mounting bracket 16 within the opening in the wall 13 and prevent lateral and/or vertical movement of the bracket 16. This method is particularly advantageous for retrofit of drywalls but is also useful in new construction in these situations where a wiring device is to be located at a distance from a stud in the wall.

A wiring device 11 is connected to the mounting bracket 16 by placing the wiring device 11 against the flange 28 on the respective mounting clips 25 on the front face of the wall 14. A fastener (not shown) is inserted through an opening in the wiring device 11, through the wall 13 and into the auxiliary boss 31 on the first portion 18 of the side member 17 adjacent to the rear face 15 of the wall 13. Most wiring devices 11 have four fasteners so that the wiring device 11 is securely connected to the bracket 16 and most wiring devices 11 extend partially into the opening 12 in the wall 13.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A mounting bracket for securing a wiring device to a front of a wall panel without the need for attaching the mounting bracket to a stud through a rectangular opening in the wall panel; the rectangular opening having a horizontal, a vertical and diagonal dimension, the mounting bracket having a diagonal dimension less than the diagonal dimension of the wall opening and the wiring device, so that the mounting bracket can be inserted through the opening of the wall panel, the mounting bracket being flush with a back of the wall panel the mounting bracket having a horizontal dimension greater than the horizontal dimension of the opening and a vertical dimension greater that the vertical dimension of the opening, a clip having a depth greater than the depth of the wall panel, the clip having a first surface engagable with the mounting bracket against the back of the wall panel and a second surface engagable with the front of the wall panel in a position securing the mounting bracket to the wall panel, the wall panel having openings positioned to receive fasteners for mounting the wiring device to the wall panel.

2. A mounting bracket for a wiring device, wherein the mounting bracket is mounted onto a wall having substantially planar front and rear faces and further having an opening therebetween, such that mounting to a stud is not necessary, the mounting bracket comprising, in combination, a bracket having at least two side members, each of the side members having a first portion abutting against the rear face of the wall, each of the side members further having a second portion abutting against the opening in the wall between the front and rear faces thereof, the first portion of each side member having a pair of spaced-apart recesses formed therein and further having a mounting boss between the recesses, and a pair of clips, one clip for each side member of the bracket, each clip having a body portion abutting against the second portion of the side member of the bracket, a pair of ears carried by the body portion of each clip and engaging the respective recesses in the first portion of the respective side member of the bracket, and a flange carried by the body portion of each clip and abutting against the front face of the wall, thereby sandwiching the wall between the flange on each clip and the first portion of the side member of the bracket, each flange having an opening formed therein, and a respective fastener passing through the opening in each flange, through the wall, and into the mounting boss on the first portion of the side member of the bracket, thereby securing the mounting bracket to the wall.

3. The combination of claim 2, wherein the bracket comprises an open rectangular frame.

4. The combination of claim 3, wherein the frame comprises a square molded plastic member.

5. The combination of claim 2, wherein each clip comprises a stamped sheet metal member.

6. The combination of claim 5, wherein the pair of recesses in the first portion of the side member in the bracket comprises respective slotted recesses, and wherein the ears on each clip are substantially arcuate and are bent back towards the flange on the clip and are received in the respective slotted recesses.

7. A mounting bracket for a wiring device, wherein the mounting bracket is mounted onto a drywall having substantially planar front and rear faces and further having an opening therebetween, such that mounting to a stud is not necessary, the mounting bracket comprising, in combination, a bracket comprising an open rectangular frame having at least two parallel side members, each of the side members having a first portion abutting against the rear face of the drywall, each of the side members further having a second portion substantially perpendicular to the first portion of the side member and abutting against the opening in the drywall between the front and rear faces thereof, the first portion of each side member having a pair of spaced-apart slotted recesses formed therein and further having a mounting boss between the recesses, and a pair of clips, one clip for each side member of the bracket, each clip having a body portion abutting against the second portion of the side member of the bracket, a pair of arcuate ears integral with the body portion of the clip and engaging the respective slotted recesses in the first portion of the respective side member of the bracket, and a flange integral with the body portion of each clip and abutting against the front face of the drywall, thereby sandwiching the drywall between the flange on the clip and the first portion of the side member of the bracket, the flange having an opening formed therein, and a fastener passing through the opening in each flange, through the drywall, and into the respective mounting boss in the first portion of the side member of the bracket, thereby securing the bracket to the drywall.

8. The combination of claim 7, further comprising a plurality of spaced-apart auxiliary bosses formed on the respective first portions of opposite parallel side members, a respective fastener passing through the wiring device, through the drywall and into the respective auxiliary boss, thereby securing the wiring device to the mounting bracket.

9. The method of mounting a mounting bracket for a wiring device on a drywall, comprising the steps of providing a bracket, the bracket including at least one side member having a pair of portions including first and second portions substantially at right angles to each other, providing a pair of spaced-apart recesses on the first portion of the side member, forming an opening in the drywall, the drywall having a front face and a rear face with the opening therebetween, inserting the bracket through the opening in the drywall and positioning the bracket such that the first portion of the side member of the bracket is flush against the rear face of the drywall and such that the second portion of the side member of the bracket is flush against the opening in the drywall, providing a retaining clip, the retaining clip having a body portion, a pair of spaced-apart ears, and a flange, inserting the ears of the retaining clip into the respective spaced-apart recesses in the first portion of the side member of the bracket, pivoting the retaining clip on the ears such that the body portion of the clip is substantially flush against the second portion of the side member of the bracket, and such that the flange on the clip is substantially flush against the front face of the drywall, and driving a fastener through the flange on the retaining clip, through the drywall, and into the first portion of the side member of the bracket, such that the drywall is sandwiched between the retaining clip and the bracket.

10. The method of claim 9, further comprising the steps of providing an opening in the flange of the retaining clip to accommodate passage of the fastener therethrough, and providing a mounting boss on the first portion of the side member of the bracket to receive the fastener therein, the mounting boss being disposed between the pair of recesses for the ears on the clip 11. The method of claim 10, further including the steps of providing a pair of substantially parallel side members on the bracket, the side members being substantially parallel to each other, and providing a pair of retaining clips, one for each side member on the bracket.

* * * * *